United States Patent [19]

Lipke, deceased

[11] 3,821,557

[45] June 28, 1974

[54] DEVICE FOR CHECKING MOVABLE WEBS OF PAPER, SYNTHETIC MATERIAL, METAL FOILS, AND THE LIKE

[76] Inventor: Paul Lipke, deceased, late of Walther-Rathenau-Str. 14, 5450 Neuwied, Germany by Rudolph Hiemke, testamentary executor

[22] Filed: Mar. 12, 1973

[21] Appl. No.: 340,001

[30] Foreign Application Priority Data
Mar. 10, 1972 Germany.......................... 2211654

[52] U.S. Cl................. 250/572, 250/235, 356/199
[51] Int. Cl...................... G01n 21/18, G01n 21/30
[58] Field of Search ......... 250/219 DF, 219 Q, 235, 250/572, 571; 356/199

[56] References Cited
UNITED STATES PATENTS

| | | | |
|---|---|---|---|
| 2,961,547 | 11/1960 | Snavely | 250/235 X |
| 3,062,965 | 11/1962 | Sick | 250/236 |
| 3,206,606 | 9/1965 | Burgo et al. | 250/219 DF |
| 3,524,988 | 8/1970 | Gaither | 250/219 DF |

*Primary Examiner*—James W. Lawrence
*Assistant Examiner*—T. N. Grigsby
*Attorney, Agent, or Firm*—Walter Becker

[57] ABSTRACT

A device for checking a moving web in which a small beam of radiation is generated which is deflected by deflecting means which includes a small light-weight oscillating element so as to scan the moving web from side to side while radiation sensitive means is provided to intercept the beam as it leaves the web.

13 Claims, 2 Drawing Figures

PATENTED JUN 28 1974 3,821,557

DEVICE FOR CHECKING MOVABLE WEBS OF PAPER, SYNTHETIC MATERIAL, METAL FOILS, AND THE LIKE

The present invention relates to a device for checking movable widths of webs of paper, synthetic material, metal foils, and the like, with regard to changes in the surface quality or with regard to the degree of reflection, by means of a source of ratiation emitting a narrow light beam, and by means of a deviating device which reflects the light beam and leads the same as test beam transverse to the direction of movement of the web and by means of a device which is light sensitive and receives the light reflected by the web.

A device has become known, according to which a light beam is deviated by a rotating polygonal mirror and is as test beam guided transverse to the direction of movement of the web to be tested and above the latter. At a correspondingly high speed of the polygonal mirror, this heretofore known device permits the complete testing of a movable web of paper, or the like, with regard to faults which bring about a change in the conditions of reflection or the degree of reflection. This heretofore known device is suitable for testing webs up to a width of approximately 1.40 meters. However, this heretofore known device has inherent thereto the drawback that a considerable number of elements are necessary for carrying out the testing method. In particular, the polygonal mirror which is driven at a relatively high rotary speed is rather expensive to manufacture. In view of the considerable mass of this polygonal mirror and the high speed at which the polygonal mirror is to be rotated, it is indispensable for purposes of carrying out a complete checkup of high speed webs, to precisely balance the polygonal mirror. In addition thereto, also the bearings for the polygonal mirror are subjected to considerably requirements. Finally, the manufacture and adjustment of the individual mirror elements of the polygonal mirror entails considerable costs.

Furthermore, so-called moving coil vibrators have become known. Such devices have a rotating coil adapted to be energized to generate rotary oscillations, to which rotary coil a mirror is rigidly connected. These devices are intended for recording oscillations on light-sensitive paper such as photopaper.

It is an object of the present invention to provide a device of the above mentioned general type which can be produced at relatively low costs and with a minimum of parts.

This object and other objects and advantages of the invention will appear more clearly from the following specification, in connection with the accompanying drawing, in which.

Figure 1:
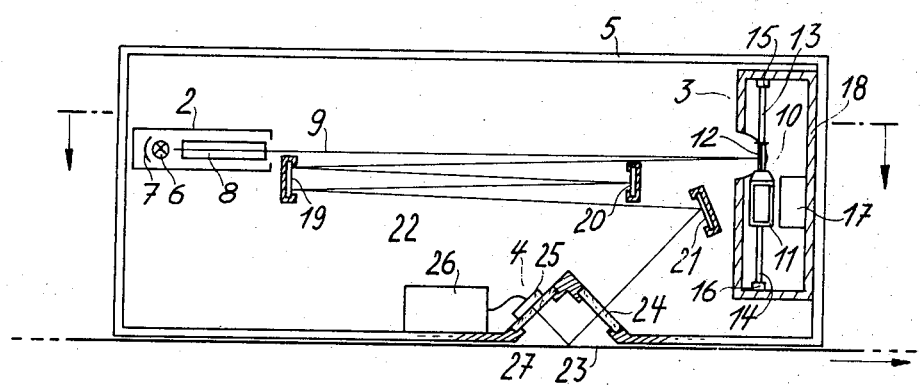
FIG. 1 is a side view, partially in section, of a device according to the invention.
Figure 2:
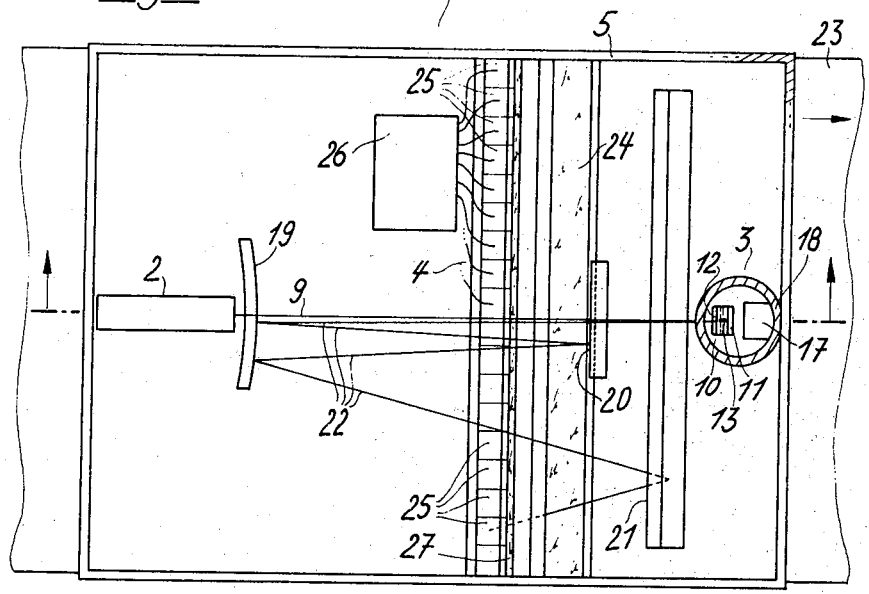
FIG. 2 is a top view, partially in section, of the device of FIG. 1.

The objects underlying the present invention have been realized by providing a deviating device in the form of a device known per se with a movable element of a low mass, which by outer forces is adapted to be energized to generate forced oscillations, especially rotary oscillations with a predetermined frequency, and which comprises a mirror of a low mass at a point where the direction of the surface normal of the mirror changes with the oscillations of the movable element.

Such movable element may, for instance, be designed in the manner of a torsion pendulum which is energized by an electromagnetic alternating field. However, it is also possible, to take advantage of bending vibrations of electromechanical converters. With a low mass of the movable element, the element may be caused to generate vibrations or oscillations of such high frequency that even webs can be felt or checked completely which move at a speed, for instance, of 10 meters per second. In this connection the device according to the invention is particularly well suitable for the check of webs of relatively small width, for instance, a width of 10 centimeters, because in such an instance, the vibration employed can with a predetermined length of the testing beam be kept small. With a testing device according to the invention, rotations or tilting movements of the mirror rigidly connected to the movable element, by from 1 to 2 degrees with regard to the surface normal of the mirror were sufficient for feeling or scanning a web of the above mentioned width. The costs of construction for such deviating device are rather low in comparison to the costs involved with heretofore known testing devices for deviating the testing beam.

According to a particular feature of the invention, it is advantageous to employ a moving coil vibrator known per se, as deviating device.

For purposes of reducing the dimensions of the device and in order to obtain a length of the test beam which will be sufficient for the desired deflection of the test beam, it is suggested according to a further development of this invention to provide one or more deviating or deflecting mirrors. In this connection, for purposes of increasing the deflection of the test beam, it is suggested according to a further feature of the invention to design one of the deflecting mirrors as a convex mirror.

Particularly when checking movable metal foils or articles with a finely metallic surface, it is necessary in order to recognize finest enclosures such as quartz enclosures, to employ an extremely fine test beam which means a test beam of a very minute diameter. By customary optical means such test beam can hardly be produced with a commercially feasible expenses. Therefore, accordimg to a further feature of the invention, it is suggested that as light source, a laser be provided. In addition thereto, in some instances improvements in the obtained measurement can be realized by polarizing the light employed for testing purposes. Such polarization may be obtained with any standard means. Furthermore, it has proved expedient in some instances to employ light of different wave lengths.

The imaginary test trace left by the testing beam on the web to be checked, has a likewise sine-shaped contour, in conformity with the vibration path of the movable element. Therefore, also the angular velocity of the testing beam continuously changes and thereby the feeling or scanning speed, and more specifically, changes between a maximum value and zero. In order to obtain at least approximately uniform conditions, it is expedient for checking a web to use only such range of the entire deflection within which the respective angular velocity of the testing beam differs only immaterially from the maximum angular velocity.

For purposes of checking wider widths or webs, a plurality of devices according to the invention may be arranged one adjacent to the other. In this connection, the deflecting mirrors designed as plane mirrors may extend in a continuous manner over the entire width.

If, for certain purposes, it should be advantageous to direct the testing beam in one direction only over the web, it is possible for this purpose to dark-control the light beam by any standard means heretofore known for such purpose, and to do this during such period of a vibration of a movable element during which the mirror would deflect the test beam in the other direction over the web. With a correspondingly high frequency of the oscillations or vibrations of the movable element, it is possible in spite of the sine-shaped course of the checking track, while considering the thickness or diameter of the light beam to obtain a complete check of a movable web.

In view of the outer dimensions and as low as possible inertia moment, it is advantageous to employ a moving coil vibrator as deflecting device because with such vibrator high frequencies of the rotary vibrations or oscillations can be realized. The mass of the movable element of such vibrators is of the magnitude of approximately 1 mg.

Referring now to the drawing in detail, the device generally designated 1 consists primarily of a beam source 2, a deflecting device 3 and a light sensitive device 4. The beam source 2, the deflecting device 3, and the light sensitive device 4 are arranged in a dust-tight housing 5.

The beam source 2 comprises a light source 6, a mirror 7, an optical means 8 for focusing or sharply bundling the light beam 9. For purposes of obtaining a sharply bundled light beam, the light source 2 may comprise, for instance, a laser. Also the employment of light or radiation or a certain selected wave length may be expedient with certain materials to be tested. In such an instance, an expediently non-illustrated standard means may be employed for varying the wave length of the emitted light or emitted radiation.

Opposite the beam source 2, the housing 5 there is provided the deflecting device 3 which comprises an element 10 adapted to be subjected to rotary vibrations and corresponding substantially to a moving coil vibrator of any standard type. The element 10 comprises a rotary coil 11 and a mirror 13 rigidly connected to said coil 11. The element 10 is connected to stationary bearings 15 and 16 by clamping bands 13, 14. The bands or strips 13 and 14 permit a certain turning of the element 10. Within the range of the rotary coil 11 there is provided a magnet 17 which is connected to the coil of the housing 18 of the deflecting device 3. The mass of the rotary coil 11 and the mirror 12 is of the magnitude of 1 mg. Correspondingly small is also the inertia moment of the element 10. Instead of such electromechanically effective deflecting devices, also with equal success deflecting devices may be employed, the movable element of which is energized for instance by ultra sound. An alternating current of predetermined frequency and intensity is, from a non-illustrated source of alternating current, conveyed to the rotary coil 11 through the clamping bands 13 and 14, whereby the rotary coil 11 and thereby the mirror 12 carry out corresponding rotary oscillations or vibrations. In the housing 5, there are furthermore provided stationary deflecting mirrors 19, 20 and 21 for extending the testing beam 22, and thereby for obtaining a sufficient deflection of the test beam transverse to the direction of movement of the movable web 23 and transverse to its deflection onto the web 23 at an angle which is favorable for the checking operation. In order further to increase the deflection of the testing beam 22 without having to enlarge the amplitude of the oscillations of element 10, the deflecting mirror 19 is designed as convex mirror. The light beam emitted by the beam source 2 impacts upon the mirror 12 of the element 10. The light beam 9 reflected by the mirror 12 and now designated as test beam 22 will, in view of a certain inclination of the mirror 12 or element 10, relative to the light beam 9, first impact upon the deflecting mirror 19. After being reflected by the mirror 19, the test beam 22 impacts upon the plane mirror 20. After reflection by the plane mirror 20, the test beam 22 again impacts upon the deflecting mirror 19. After being again reflected by the deflecting mirror 19, the test beam 22 impacts upon the deflecting mirror 21 which directs the test beam 22 through a cover disc 24 in housing 5 onto the web 23. The light reflected by the web 23 partially passes to the photoelectric cells 25 of the light sensitive device 4. The photoelectric cells 25 are connected to an amplifier 26. For sealing the housing 5 against the entry of dust, a further cover disc 27 is provided on that side where the photoelectric cells 25 are located.

Instead of evaluating the light reflected by the web, it is also possible to arrange the light sensitive device on that side of the web which is located opposite to the beam source in order to be able to evaluate the light passing through the web. In this way, it is possible to indicate the changes of the inner structure, especially of paper webs, for instance, by partial substantial increase in the light permeability.

It is, of course, to be understood that the present invention is, by no means, limited to the particular showing in the drawing, but also comprises any modifications within the scope of the appended claims.

What is claimed is:

1. A device for checking at least one quality of a web moving along a path comprising: a source of radiation and means for forming a beam of said radiation, beam deflecting means in the path of said beam and deflecting said beam toward one surface of the web, said deflector means including at least one oscillatable element of small mass and drive means for driving said element in oscillation, said element when oscillating causing that portion of said beam between said element and said web to oscillate laterally to the direction of movement of the web between predetermined limits whereby the web is scanned between said limits during movement of the web, and radiation sensitive means positioned to intercept the beam after impingement thereof on the web, said source being a light source and said deflecting means comprising mirror means, said mirror means comprising a plurality of mirrors and one of which forms said element, at least one of said mirrors being a convex mirror.

2. A device according to claim 1, in which a moving coil vibrator means serves as a drive means to oscillate said mirror means.

3. A device according to claim 1 in which said deflecting means directs said beam angularly toward the one surface of the web and the beam reflects off the web, said radiation sensitive means being on the same side of the web as said deflecting means.

4. A device according to claim 1 in which said mirror means directs the oscillating portion of said beam angularly toward the one surface of the web and said radiation sensitive means comprises photosensitive cell means distributed laterally to the direction of movement of the web and positioned to intercept the beam as the beam reflects from the one surface of the web.

5. A device according to claim 1 in which said element is a small mirror and said drive means comprises an electromagnetic vibrator.

6. A device according to claim 1 in which said source comprises a laser.

7. A device according to claim 1 in which said source is a source of light, and means for polarizing the beam formed from the light.

8. A device according to claim 1 in which said source is a source of light, and means for varying the wave length of said light.

9. A device according to claim 1 in which means for range of oscillation of said element is provided during scanning of the web over which correspondingly the speed of oscillation of the beam is substantially uniform.

10. A device according to claim 1 which includes more than one of said devices in side by side relation for checking webs wider than the width that can be scanned by a single device.

11. A device according to claim 1 in which said small mirror is flat and said beam is small in cross sectional area and falls first on said small mirror and then on said convex mirror.

12. A device according to claim 11 in which the beam reflecting off said convex mirror falls on another flat mirror and then again on said convex mirror, the beam when reflected the second time from said convex mirror falling on a still further flat mirror from which the beam is reflected angularly toward the one surface of the moving web.

13. A device according to claim 12 in which all of said mirrors extend transversely to the direction of movement of the web and said beam prior to falling on said mirror is parallel to the direction of movement of the web.

* * * * *

UNITED STATES PATENT OFFICE
CERTIFICATE OF CORRECTION

Patent No. 3,821,557    Dated June 28, 1974

Inventor(s) Paul Lippke, deceased, by Rudolph Hiemke

It is certified that error appears in the above-identified patent and that said Letters Patent are hereby corrected as shown below:

Applicant's name should read -- Paul Lippke --.

Signed and sealed this 1st day of October 1974.

(SEAL)
Attest:

McCOY M. GIBSON JR.
Attesting Officer

C. MARSHALL DANN
Commissioner of Patents